United States Patent
Ku et al.

(10) Patent No.: US 8,537,585 B2
(45) Date of Patent: Sep. 17, 2013

(54) DC-AC CONVERTER

(75) Inventors: Chen-Wei Ku, Taoyuan Hsien (TW); Lei-Ming Lee, Taoyuan Hsien (TW); Ho Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 13/426,155

(22) Filed: Mar. 21, 2012

(65) Prior Publication Data

US 2013/0010512 A1 Jan. 10, 2013

(30) Foreign Application Priority Data

Jul. 8, 2011 (TW) .............................. 100124352 A

(51) Int. Cl.
*H02M 7/5387* (2007.01)
*H02M 3/335* (2006.01)

(52) U.S. Cl.
USPC ............................................ 363/132; 363/17

(58) Field of Classification Search
USPC .............. 363/16, 17, 37, 95, 98, 97, 131, 132
See application file for complete search history.

(56) References Cited

U.S. PATENT DOCUMENTS 7,046,534 B2 * 5/2006 Schmidt et al. ............... 363/132

* cited by examiner

*Primary Examiner* — Timothy J Dole
*Assistant Examiner* — Carlos Rivera-Perez
(74) *Attorney, Agent, or Firm* — Kirton McConkie; Evan R. Witt

(57) ABSTRACT

Disclosed is a DC-AC converter including a switch circuit for converting the DC power to output an AC voltage between a first output terminal and a second output terminal. The switch circuit includes a first switch branch having a first switch element and a second switch element; a second switch branch having a third switch element, a fourth switch element, and a fifth switch element; and a sixth switch element having one end connected between the third switch element and the fourth switch element and the other end connected between the first switch element and the second switch element. The first switch element, the second switch element, the third switch element, the fourth switch element, the fifth switch element, and the sixth switch element are configured to turn on/off to enhance the conversion efficiency of the DC-AC converter and subdue the occurrence of leak current in the DC-AC converter.

15 Claims, 10 Drawing Sheets

US 8,537,585 B2

DC-AC CONVERTER

FIELD OF THE INVENTION

The invention relates to a converter, and more particularly to a DC-AC converter.

BACKGROUND OF THE INVENTION

Nowadays, the major energy source for humankind comes from petroleum. The power or electricity required to drive a car or run a thermal power plant is supplied by burning petroleum. However, the heat and exhaust generated during the combustion of the petroleum not only can deteriorate the air quality, but can worsen the global warming effect. Besides, the yield of the petroleum will reach culmination in ten years and then will decline year by year. This means that the oil price (including the electricity tariff) will not be cheap anymore. Therefore, the energy crisis might come up eventually and cause global economic storm.

In view of the forthcoming global economic storm, renewable energy has been discovered to provide electricity or mechanical power efficiently and economically for households or industries. Thus far, the development of renewable energy has become an important energy policy for developed countries as a win-win strategy for power generation and environmental protection. Among various renewable energy, such as solar energy, wind energy, tidal energy, geothermal energy, and biowaste energy, the solar energy has become the mainstream as the solar energy generator has the advantages of high eco-friendliness, easiness of installation, matureness of commercial merchandising, and the overwhelming promotion lead by the country. Hence, solar energy has become a major choice for developed countries in pursuing distributed power supply system.

Referring to FIG. 1, in which the circuitry of a DC-AC converter according to the prior art is shown. As shown in FIG. 1, the DC-AC converter 1 is used in solar grid-connected photovoltaic system, and thus the DC-AC converter 1 is also known as a photovoltaic inverter, or PV inverter. The DC-AC converter 1 is configured in an non-isolated and full-bridge topology, and includes an input filter 10, a full-bridge switch circuit 11, and an output filter 12. The input filter 10 is consisted of a first capacitor $C_1$ that receives a DC input voltage $V_{DC}$ generated by a solar cell and filters the DC input voltage $V_{DC}$. The full-bridge switch circuit 11 is connected to the output filter 12 and is consisted of switch elements $S_1$-$S_4$, in which the first switch element $S_1$ is connected in series with the second switch element $S_2$ and the third switch element $S_3$ is connected in series with the fourth switch element $S_4$ so as to form a full-bridge circuit with two bridge arms. The switch elements $S_1$-$S_4$ are controlled by a control unit (not shown) to turn on or off, thereby allowing the full-bridge switch circuit 11 to convert the filtered DC input voltage $V_{DC}$ into an AC modulating voltage $V_T$. The output filter 12 is connected to the full-bridge switch circuit 11 and is consisted of a first inductor $L_1$, a second inductor $L_2$, and a second filtering capacitor $C_2$. The output filter 12 is used to remove the high-frequency components of the AC modulating voltage $V_T$ to output an AC output voltage Vo to a grid G.

Generally, the switch elements $S_1$-$S_4$ of the full-bridge switch circuit 11 are configured to operate under the pulse-width modulation (PWM) fashion. More precisely, the switch elements $S_1$-$S_4$ of the full-bridge switch circuit 11 can operate under the bipolar switching mode or the unipolar switching mode depending on the operation mode of the switch elements $S_1$-$S_4$. Referring to FIGS. 2 and 3, in which FIG. 2 is the waveform diagram of the modulating voltage of the full-bridge switch circuit of FIG. 1 which is operating under the bipolar switching mode, and FIG. 3 is the waveform diagram of the modulating voltage of the full-bridge switch circuit of FIG. 1 which is operating under the unipolar switching mode. As shown in FIGS. 1-3, the switch elements $S_1$ to $S_4$ are configured to operate with a high frequency under the bipolar switching mode. Under this condition, the AC modulating voltage $V_T$ outputted by the full-bridge switch circuit 11 is fluctuated between the positive DC input voltage $V_{DC}$ and the negative DC input voltage $-V_{DC}$ during the positive half-cycles or negative half-cycles, as shown in FIG. 2. Under the unipolar switching mode, only one bridge arm of the switch circuit is operating with a high frequency while the other bridge arm of the switch circuit is turned off during each half-cycle. That is, the bridge arm consisted of the first switch element $S_1$ and the second switch element $S_2$ and the other bridge arm consisted of the third switch element $S_3$ and the fourth switch element $S_4$ are turned on and off alternately, thereby allowing the AC modulating voltage $V_T$ outputted by the full-bridge switch circuit 11 to fluctuate between 0 and the positive DC input voltage $V_{DC}$ during the positive half-cycles and fluctuate between 0 and the negative DC voltage $-V_{DC}$ during the negative half-cycles, as shown in FIG. 3.

As the full-bridge switch circuit 11 is operating under the unipolar switching mode, only one bridge arm consisted of two switch elements are configured to conduct high-frequency switching operations, instead of allowing two bridge arms consisted of switch elements $S_1$-$S_4$ to conduct high-frequency switching operations under the bipolar switching mode, the AC modulating voltage $V_T$ is fluctuating between 0 and the positive DC input voltage $V_{DC}$ or fluctuating between 0 and the negative DC input voltage $-V_{DC}$. Therefore, the switching loss of the full-bridge switch circuit 11 operating under the unipolar switching mode is less than the switching loss of the full-bridge switch circuit 11 operating under the bipolar switching mode. In other words, the full-bridge switch circuit 11 will have better conversion efficiency under the unipolar switching mode. However, as a parasite capacitance $C_p$ is existed between the solar cell which generates the DC input voltage $V_{DC}$ and the ground terminal, as shown in FIG. 1, the modulating voltage $V_T$ will have high-frequency components when the full-bridge switch circuit 11 is operating under the unipolar switching mode. Thus, the relative voltage drop between the first output terminal A' and any node within the DC-AC converter 1, such as the relative voltage drop between first output terminal A' and the common mode N' connecting the parasite capacitance $C_p$, and the relative voltage drop between the second output terminal B' and the common mode N', can not be set to maintain their total average value at any switching point at a constant value. This would result in a significant voltage drop across the parasite capacitance $C_p$ and cause leak current, thereby endangering human users and equipment. If the full-bridge switch circuit 11 is operating the bipolar switching mode, the leak current can be avoided.

Thus, the applicants endeavor to develop a DC-AC converter with a better conversion efficiency and lower leak current.

SUMMARY OF THE INVENTION

An object of the invention is to provide a DC-AC converter for addressing the problem of low conversion efficiency and high leak current when the conventional DC-AC converter is applied to a solar grid-connected photovoltaic system.

To this end, the invention provides a DC-AC converter, including a switch circuit configured to receive a DC power and convert the DC power into an AC modulating voltage for output between a first output terminal and a second output terminal. The switch circuit includes a first switch branch including a first switch element and a second switch element connected in series with each other, wherein the first switch element and the second switch element are connected to the first output terminal; and a second switch branch connected in parallel with the first switch branch, and including a third switch element, a fourth switch element, and a fifth switch element connected in series with each other, wherein the fourth switch element and the fifth switch element are connected to the second output terminal. The inventive DC-AC converter further includes a sixth switch element having one end connected between the third switch element and the fourth switch element, and the other end connected between the first switch element and the second switch element and connected to the first output terminal. The first switch element and the fifth switch element are turned on and off simultaneously and continuously and the sixth switch element is turned on during positive half-cycles, and the second switch element and the third switch element are turned on and off simultaneously and continuously and the fourth switch element is turned on during negative half-cycles.

Now the foregoing and other features and advantages of the invention will be best understood through the following descriptions with reference to the accompanying drawings, in which:

DESCRIPTION OF THE PREFERRED EMBODIMENT

Several exemplary embodiments embodying the features and advantages of the invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as a confinement for the invention.

Figure 4:
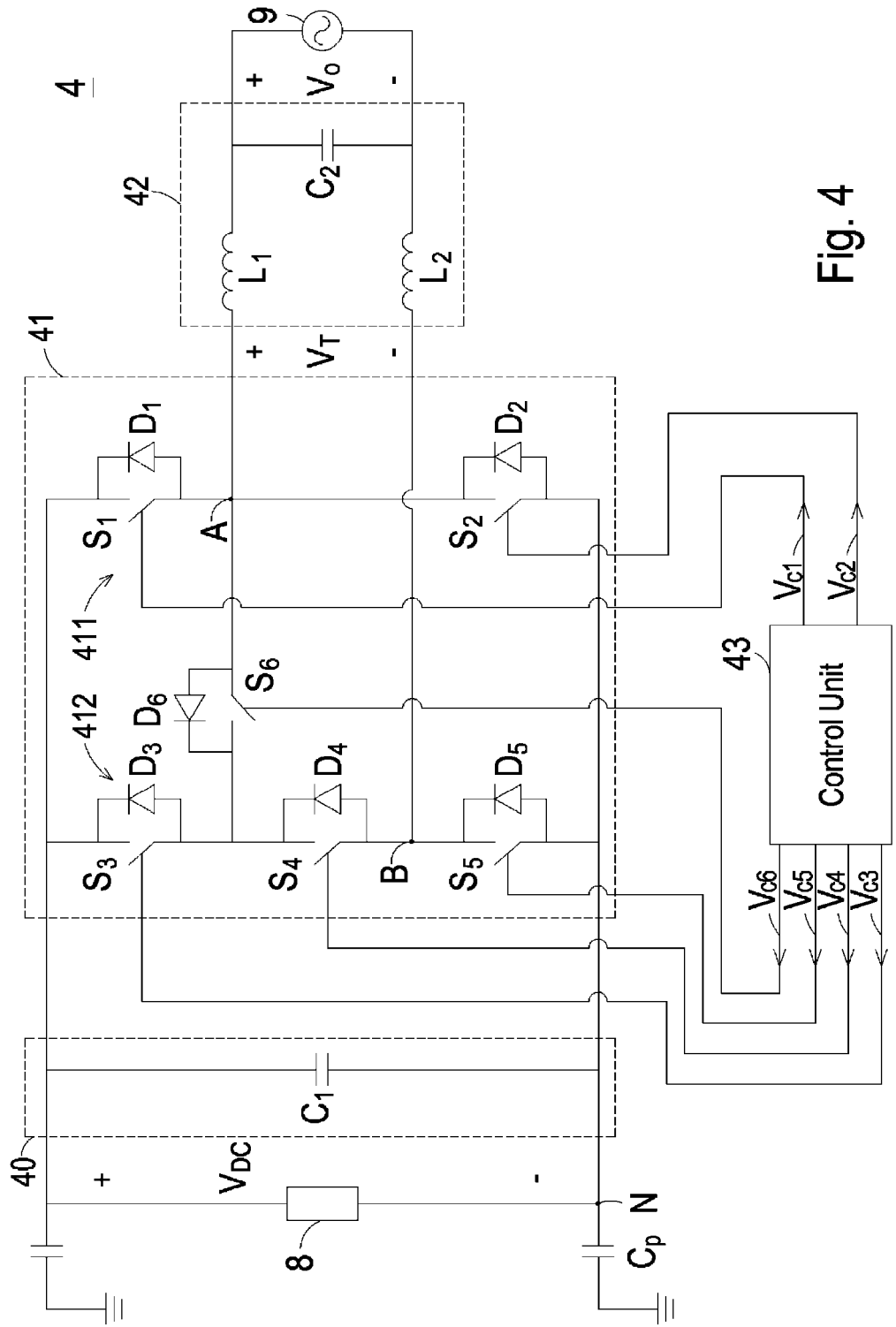
FIG. 4 shows the circuitry of a DC-AC converter according to an embodiment of the invention.

Referring to FIG. 4, in which the circuitry of a DC-AC converter according to an embodiment of the invention is shown. As shown in FIG. 4, the DC-AC converter 4 may be applied to a solar grid-connected photovoltaic system and is a non-isolated circuit. The DC-AC converter 4 is used to receive a DC input voltage $V_{DC}$ from a DC device 8 such as a solar cell, and convert the DC input voltage $V_{DC}$ into an AC output voltage $V_o$. The AC output voltage $V_o$ is supplied to an AC load 9 such as an AC appliance or an AC network system.

The DC-AC converter 4 includes an input filter 40, a switch circuit 41, an output filter 42, and a control unit 43. The input filter 40 is respectively connected to the positive terminal and negative terminal of the DC device 8 for receiving the DC input voltage $V_{DC}$ and filtering the DC input voltage $V_{DC}$. In this embodiment, the input filter 40 may include a first capacitor $C_1$.

The switch circuit 41 is connected to the input filter 40 and includes switch elements $S_1$-$S_6$. The switch circuit 41 is used to convert the filtered DC input voltage $V_{DC}$ by means of the switching operations of the switch elements $S_1$-$S_6$, thereby outputting an AC modulating voltage $V_T$ between a first output terminal A and a second output terminal B.

In this embodiment, the first switch element $S_1$ and the second switch element $S_2$ are connected in series with each other and form a first switch branch 411. One end of the first switch element $S_1$ is connected to the positive terminal of the DC device 8 and the positive terminal of the input filter 40. One end of the second switch element $S_2$ is connected to the negative terminal of the DC device 8 and the negative terminal of the input filter 40. The third switch element $S_3$, the fourth switch element $S_4$, and the fifth switch element $S_5$ are connected in series with each other and form a second switch branch 412 which is connected in parallel with the first switch branch 411. One end of the third switch element $S_3$ is connected to the positive terminal of the DC device 8 and the positive terminal of the input filter 40. One end of the fifth switch element $S_5$ is connected to the negative terminal of the DC device 8 and the negative terminal of the input filter 40. One end of the sixth switch element $S_6$ is connected between the third switch element $S_3$ and the fourth switch element $S_4$ of the second switch branch 412, and the other end of the sixth switch element $S_6$ is connected between the first switch element $S_1$ and the second switch element $S_2$ of the first switch branch 411 at the first output terminal A.

In this embodiment, the switch elements $S_1$-$S_6$ are consisted of MOSFETs with body diodes $D_1$-$D_6$, as shown in FIG. 4. The direction of conduction for the first body diode $D_1$ and the second body diode $D_2$ is the direction pointing from the second switch element $S_2$ to the first switch element $S_1$. The direction of conduction for the third body diode $D_3$, the fourth body diode $D_4$, and the fifth diode $D_5$ is the direction pointing from the fifth switch element $S_5$ to the first switch element $S_1$. The direction of conduction for the sixth body diode $D_6$ is the direction pointing from the first switch branch 411 to the second switch branch 412.

The control unit 43 is connected to the control terminals of the switch elements $S_1$-$S_6$. The control unit 43 is used to generate PWM-based control signals $V_{c1}$-$V_{c6}$ for controlling the switch elements $S_1$-$S_6$ to turn on or off.

The output filter 42 is connected to the first output terminal A and the second output terminal B of the switch circuit 41. Also, the output filter 42 is connected to the load 9 for receiving the AC modulating voltage $V_T$ and removing the high-frequency components of the AC modulating voltage $V_T$, thereby outputting the AC output voltage $V_o$ to the AC load 9. In this embodiment, the output filter 42 includes a first inductor $L_1$, a second inductor $L_2$, and a second capacitor $C_2$. One end of the first inductor $L_1$ is connected to the first output terminal A. One end of the second inductor $L_2$ is connected to the second output terminal B. The second capacitor $C_2$ is connected to the first inductor $L_1$, the second inductor $L_2$, and the AC load 9.

Figure 5A:
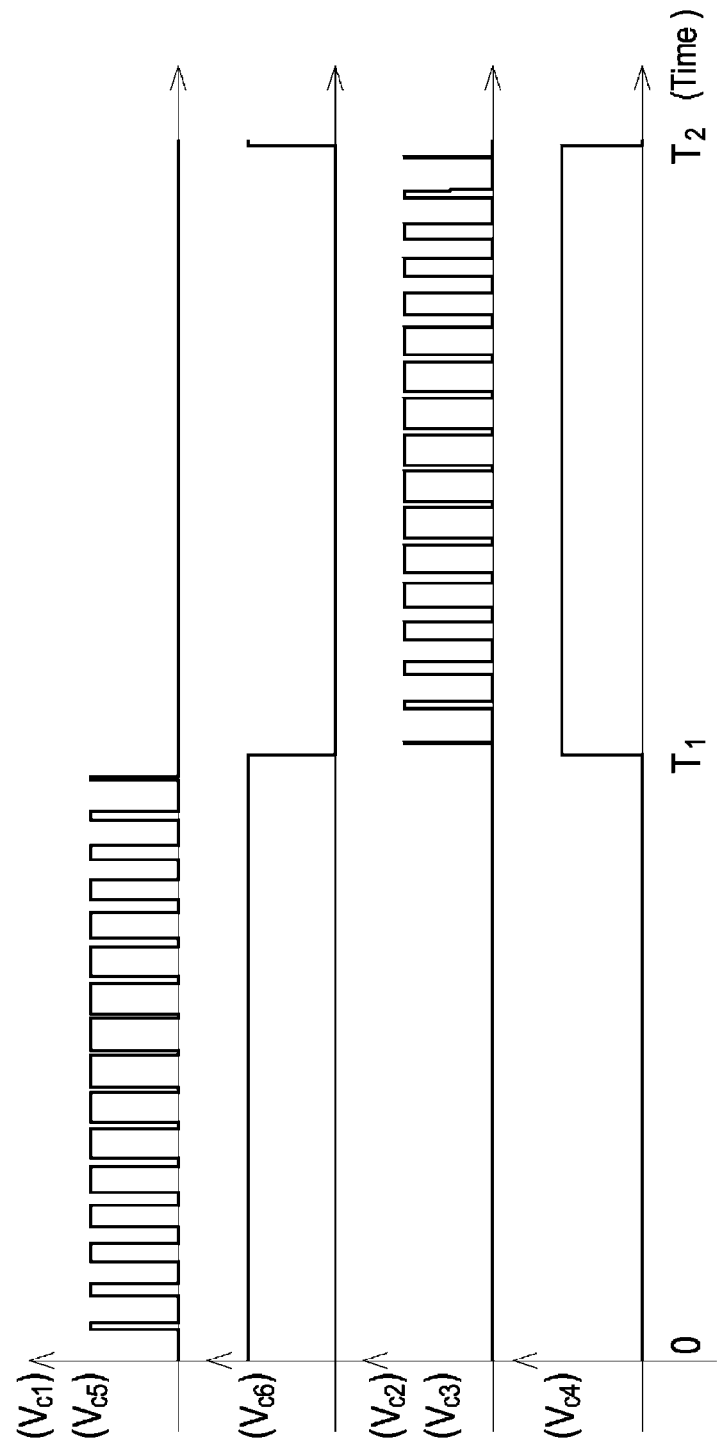
FIG. 5A shows the waveform diagrams of the control signals used within the circuitry of FIG. 4.
Figure 5B:
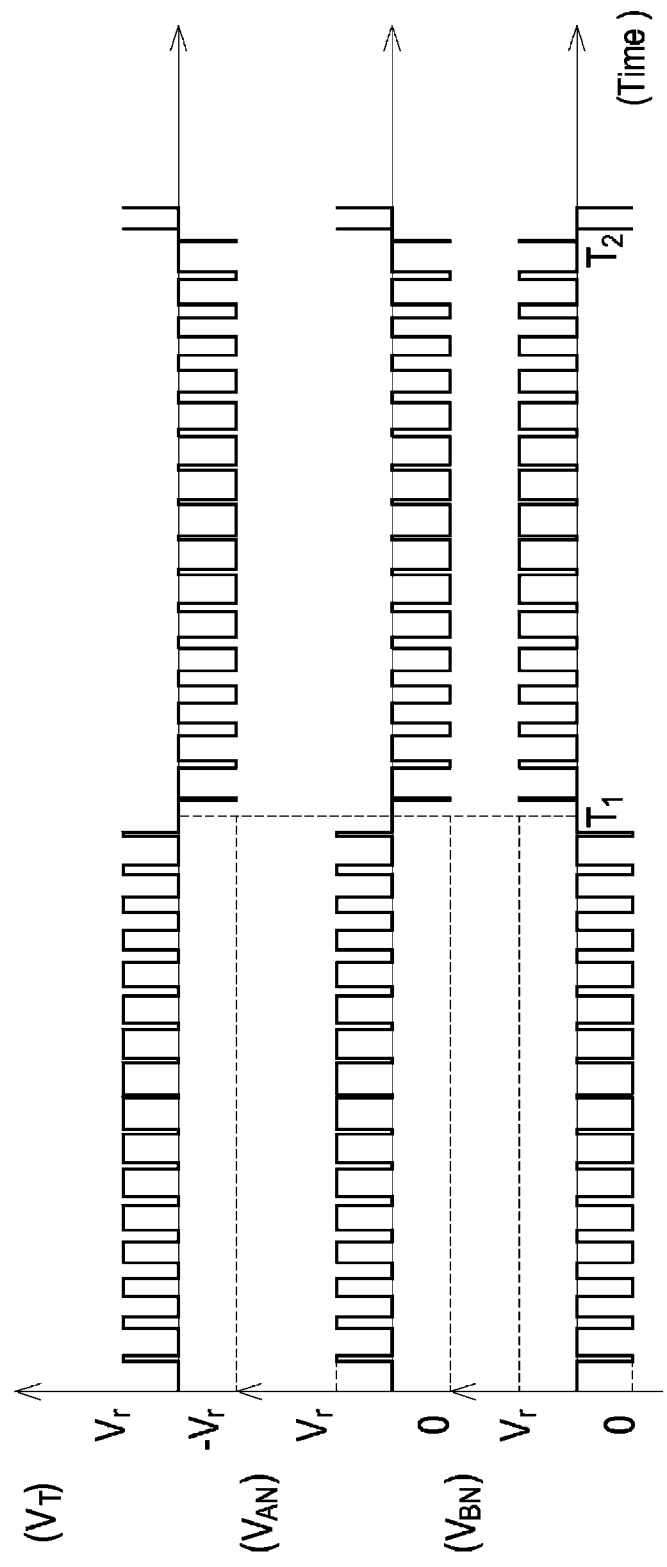
FIG. 5B shows the waveform diagrams of the AC modulating voltage used within the circuitry of FIG. 4.

Next, the operation of the inventive DC-AC converter 4 will be illustrated. Referring to FIGS. 5A and 5B and FIG. 4, in which FIG. 5A shows the waveform diagrams of the control signals used within the circuitry of FIG. 4 and FIG. 5B shows the waveform diagrams of the AC modulating voltage used within the circuitry of FIG. 4. As shown in FIGS. 4, 5A and 5B, during the positive half-cycle, e.g. during the point 0 and the first point $T_1$, the first control signal $V_{c1}$ and the fifth control signal $V_{c5}$ are fluctuated in a PWM fashion. That is, the first control signal $V_{c1}$ and the fifth control signal $V_{c5}$ are alternated between the disabled state and the enabled state. Therefore, the first switch element $S_1$ and the fifth switch element $S_5$ are turned on and off simultaneously and continuously. In addition, the second control signal $V_{c2}$, the third control signal $V_{c3}$, and the fourth control signal $V_{c4}$ are kept in the disabled state. Hence, the second switch element $S_2$, the third switch element $S_3$, and the fourth switch element $S_4$ are turned off. Furthermore, the sixth control signal $V_{c6}$ is kept in the enabled state, and thus the sixth switch element $S_6$ is turned on.

Accordingly, as the first switch element $S_1$ and the fifth switch element $S_5$ are both turned on during the positive half-cycle, the current outputted by the DC device 8 will flow through the first switch element $S_1$, the first inductor $L_1$, the second capacitor $C_2$, the second inductor $L_2$, and the fifth switch element $S_5$ in sequence. Therefore, the DC power outputted by the DC device 8 can be filtered and converted into an AC power so as to be supplied to the AC load 9. Meanwhile, the first inductor $L_1$ and the second inductor $L_2$ will store energy. As the first switch element $S_1$ and the fifth switch element $S_5$ are both turned off during the positive half-cycle, the energy stored in the first inductor $L_1$ and the second inductor $L_2$ will flow through the fourth body diode $D_4$ of the fourth switch element $S_4$ which is turned off and the sixth switch element $S_6$ which is turned on. Therefore, the AC load 9 can continuously receive the energy outputted by the DC device 8.

During the negative half-cycle, e.g. during the first point T1 and the second point T2, the second control signal $V_{c2}$ and the third control signal $V_{c3}$ are fluctuated in a PWM fashion. That is, the second control signal $V_{c2}$ and the third control signal $V_{c3}$ are alternated between the disabled state and the enabled state. Therefore, the second switch element $S_2$ and the third switch element $S_3$ are turned on and off simultaneously and continuously. In addition, the first control signal $V_{c1}$, the fifth control signal $V_{c5}$, and the sixth control signal $V_{c6}$ are transitioned to the disabled state. Therefore, first switch element $S_1$, the fifth switch element $S_5$, and the sixth switch element $S_6$ are turned off. Furthermore, the fourth control signal $V_{c4}$ is transitioned to the enabled state. Therefore, the fourth switch element $S_4$ is turned on.

Accordingly, as the second switch element $S_2$ and the third switch element $S_3$ are both turned on during the negative half-cycle, the current outputted by the DC device 8 will flow through the third switch element $S_3$, the fourth switch element $S_4$, the second inductor $L_2$, the second capacitor $C_2$, the first inductor $L_1$, and the second switch element $S_2$ in sequence. Therefore, the DC power outputted by the DC device 8 can be filtered and converted into an AC power so as to be supplied to the AC load 9. Meanwhile, the first inductor $L_1$ and the second inductor $L_2$ will store energy. As the second switch element $S_2$ and the third switch element $S_3$ are both turned off during the negative half-cycle, the energy stored in the first inductor $L_1$ and the second inductor $L_2$ will flow through the sixth body diode $D_6$ of the sixth switch element $S_6$ which is turned off and the fourth switch element $S_4$ which is turned on. Therefore, the AC load 9 can continuously receive the energy outputted by the DC device 8.

Figure 1:
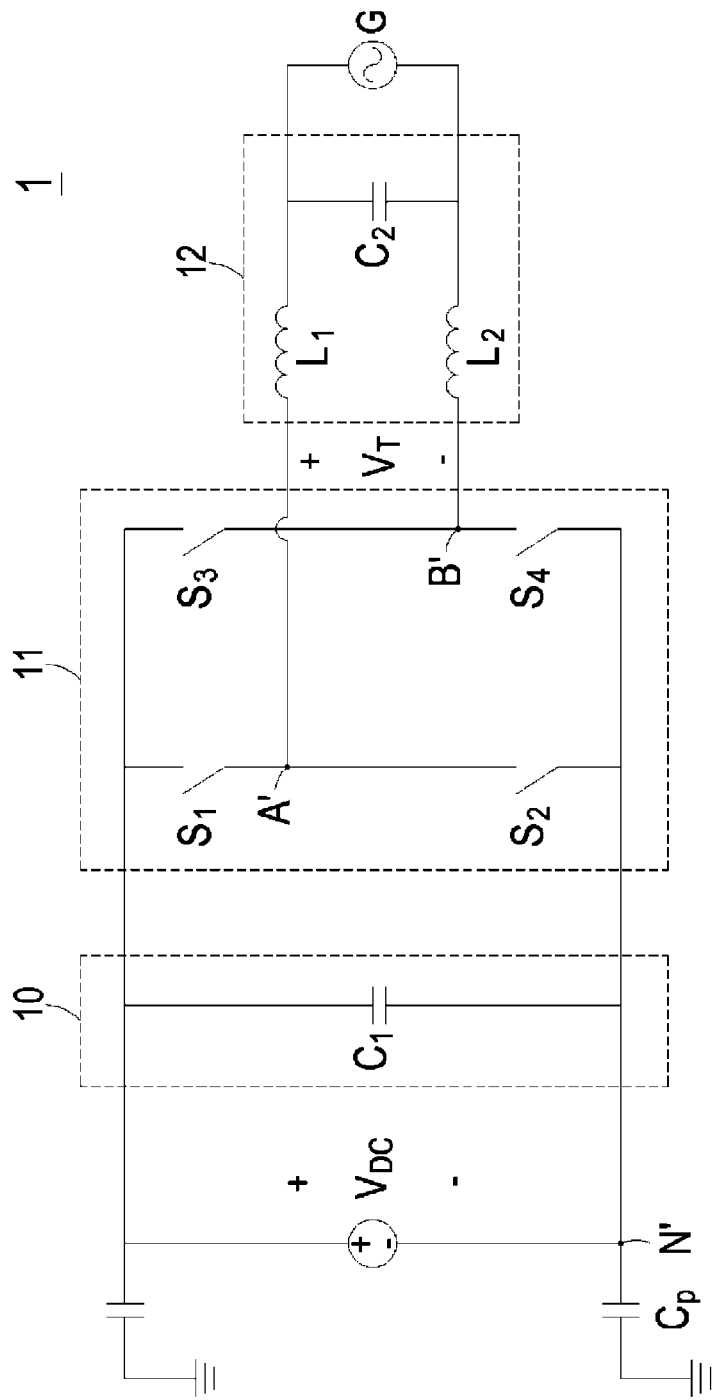
FIG. 1 shows the circuitry of a DC-AC converter according to the prior art.
Figure 2:
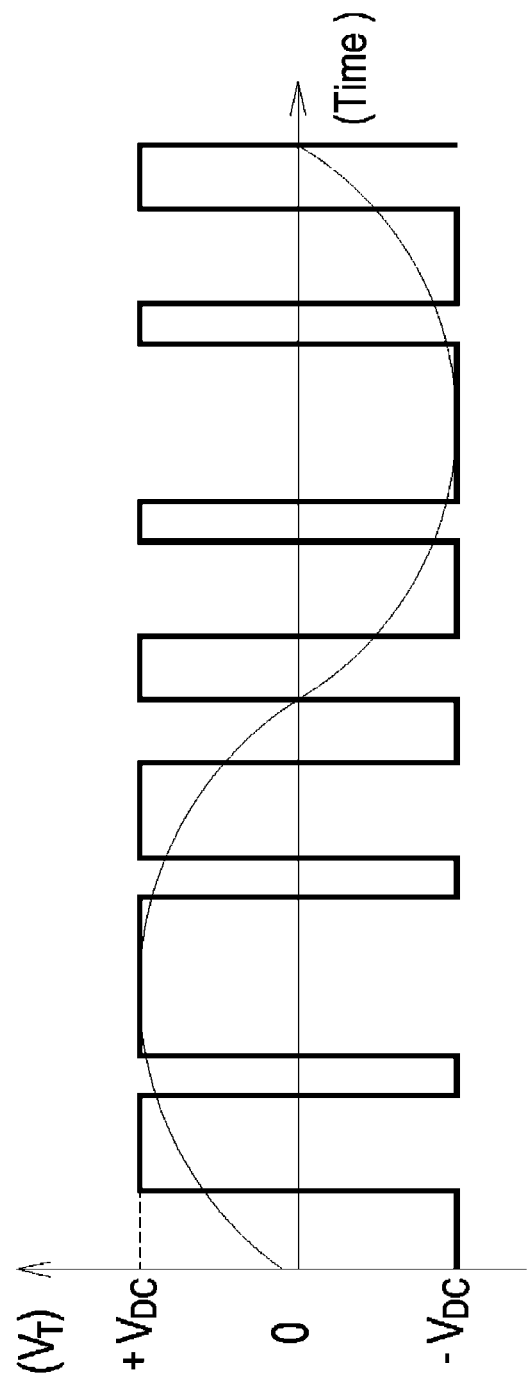
FIG. 2 is the waveform diagram of the modulating voltage of the full-bridge switch circuit of FIG. 1 which is operating under the bipolar switching mode.
Figure 3:
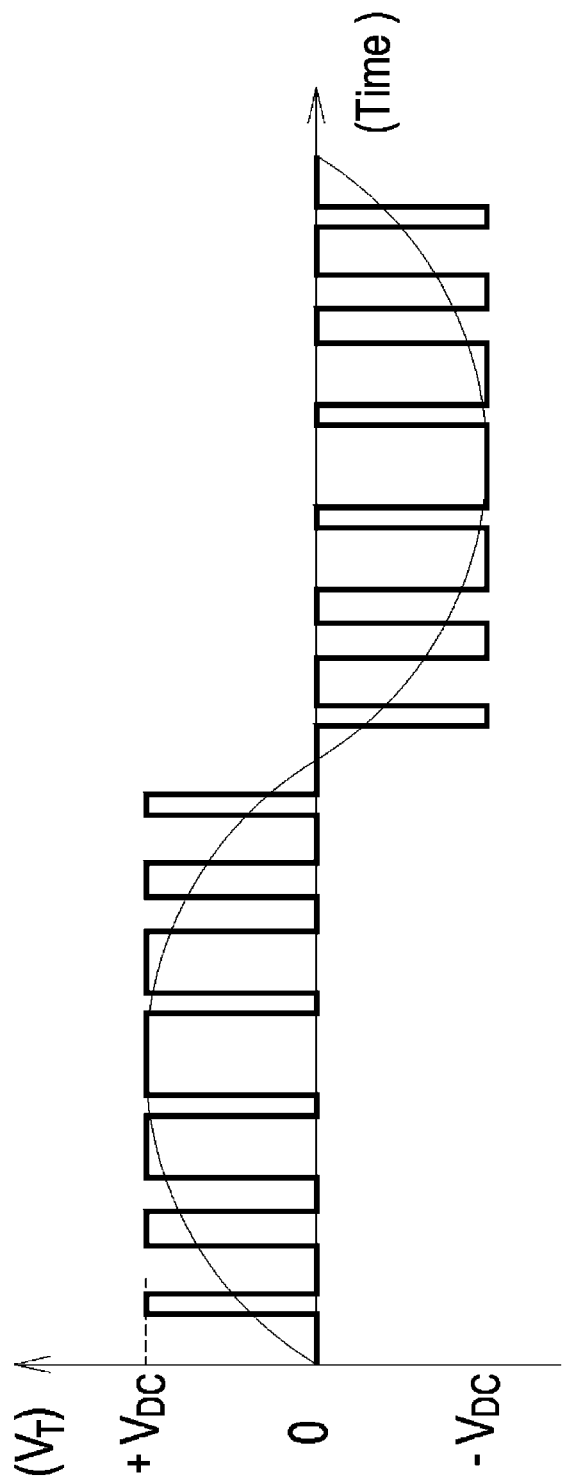
FIG. 3 is the waveform diagram of the modulating voltage of the full-bridge switch circuit of FIG. 1 which is operating under the unipolar switching mode.

Referring to FIG. 5B, with the placement of the fourth switch element $S_4$ and the sixth switch element $S_6$, the AC modulating voltage $V_T$ outputted by the switch circuit 41 is fluctuated between 0 and a positive predetermined value $V_r$ during the positive half-cycle and fluctuated between 0 and a negative predetermined value $-V_r$ during the negative half-cycle. Therefore, the practical operation of the switch circuit 41 is analogous to the operation of the full-bridge switch circuit 11 operating under the unipolar switching mode of FIG. 1. Hence, the inventive DC-AC converter 4 can reduce the switching loss of the internal switch elements of the switch circuit 41 and enhance the conversion efficiency. Also, the relative voltage drop between first output terminal A and a predetermined node within the DC-AC converter and the relative voltage drop between first output terminal B and the predetermined node within the DC-AC converter, such as the first relative voltage drop $V_{AN}$ between the first output terminal A and the node N connecting to the parasite capacitance $C_p$ shown in FIG. 4 and the second relative voltage drop $V_{BN}$ between the second output terminal B and the node N, are set to maintain their total average value at any switching point at a constant value. Hence, the parasite capacitance $C_p$ will not induce a significant voltage drop. In this manner, the occurrence of the leak current will be subdued, and risk borne by the human user and equipment will be lessened.

In the foregoing embodiments, the first control signal $V_{c1}$, the second control signal $V_{c2}$, the third control signal $V_{c3}$, and the fifth control signal $V_{c5}$ are high-frequency PWM signals, and the fourth control signal $V_{c4}$ and the sixth control signal $V_{c6}$ are low-frequency PWM signals.

Figure 6A:
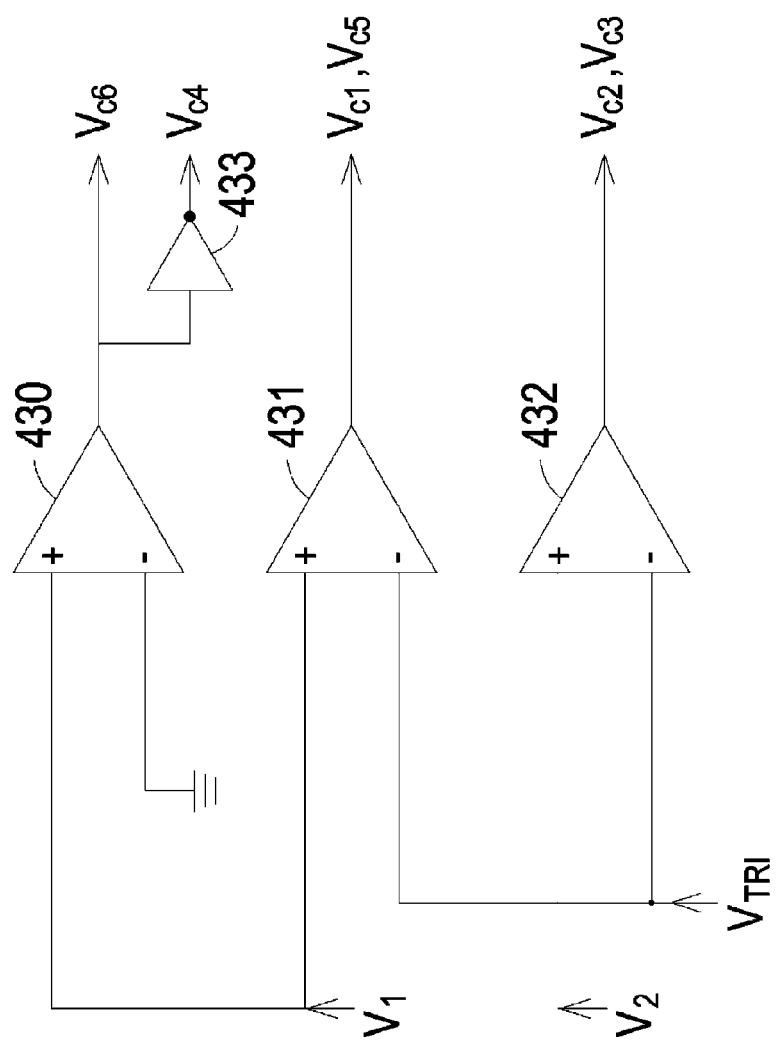
FIG. 6A shows the circuitry of the control unit of FIG. 4.
Figure 6B:
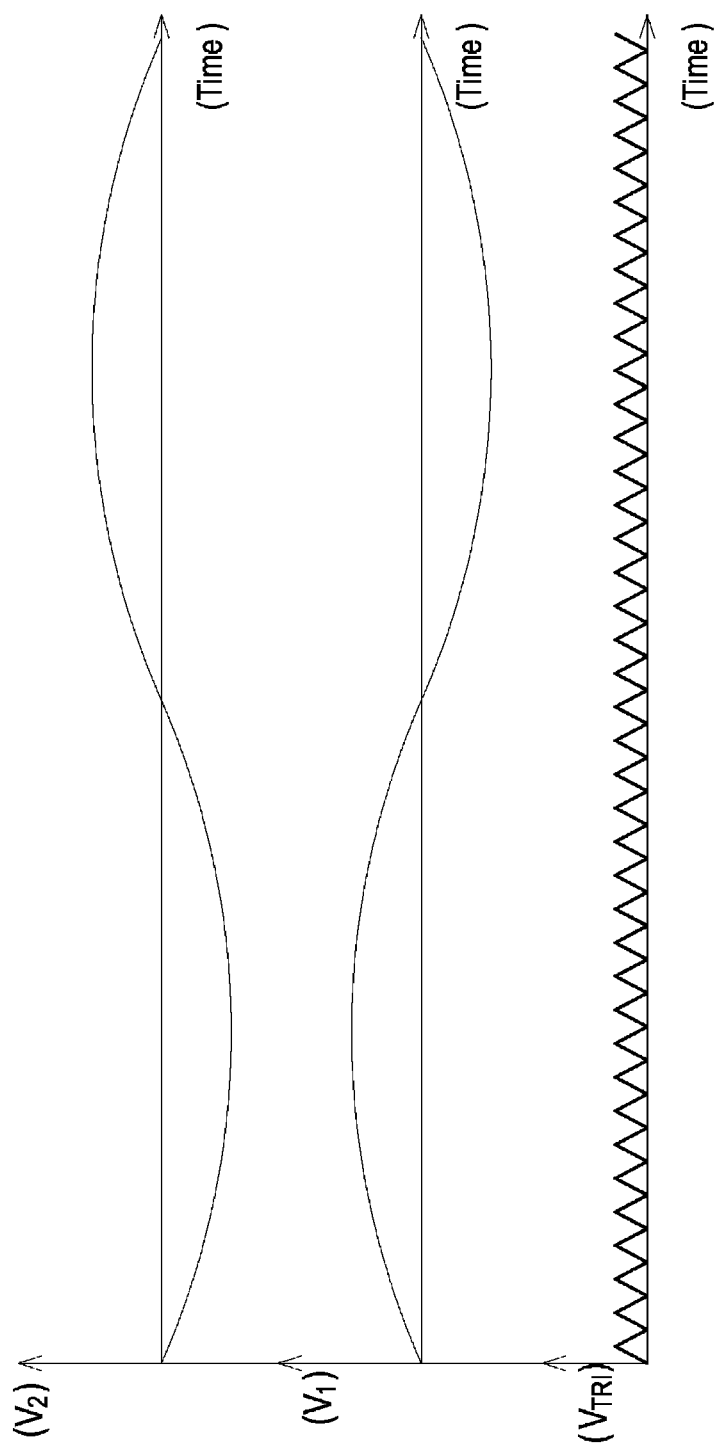
FIG. 6B shows the waveform diagrams of the control signals used within the circuitry of FIG. 6A.

Next, the circuitry of the control unit 43 of FIG. 4 will be described. Referring to FIGS. 6A and 6B, in which FIG. 6A shows the circuitry of the control unit of FIG. 4 and FIG. 6B shows the waveform diagrams of the control signals used within the circuitry of FIG. 6A. The control unit 43 includes a first comparator 430, a second comparator 431, a third comparator 432, and a NOT gate 433. The positive input terminal of the first comparator 430 is used to receive a first sinusoidal signal $V_1$, and the negative input terminal of the first comparator 430 is grounded. The output terminal of the first comparator 430 is connected to the control terminal of the sixth switch element $S_6$ for outputting the sixth control signal $V_{c6}$. The positive input terminal of the second comparator 431 is used to receive the first sinusoidal signal $V_1$, and the negative input terminal of the second comparator 431 is used to receive a triangular signal $V_{TRI}$. The output terminal of the second comparator 431 is connected to the control terminal of the first switch element $S_1$ and the control terminal of the fifth switch element $S_5$, and is used to output the first control signal $V_{c1}$ and the fifth control signal $V_{c5}$. The positive input terminal of the third comparator 432 is used to receive a second sinusoidal signal $V_2$, which has a phase difference of 180 degree with the first sinusoidal signal $V_1$. The negative input terminal of the third comparator 432 is used to receive the triangular signal $V_{TRI}$. The output terminal of the third comparator 432 is connected to the control terminal of the second switch element $S_2$ and the control terminal of the third switch element $S_3$, and is used to output the second control signal $V_{c2}$ and the third control signal $V_{c3}$. The input terminal of the NOT gate 433 is connected to the output terminal of the first comparator 430, and the output terminal of the NOT gate 433 is connected to the control terminal of the fourth switch element $S_4$. The NOT gate 433 is used to invert the sixth control signal $V_{c6}$, thereby outputting the fourth control signal $V_{c4}$.

Figure 7A:
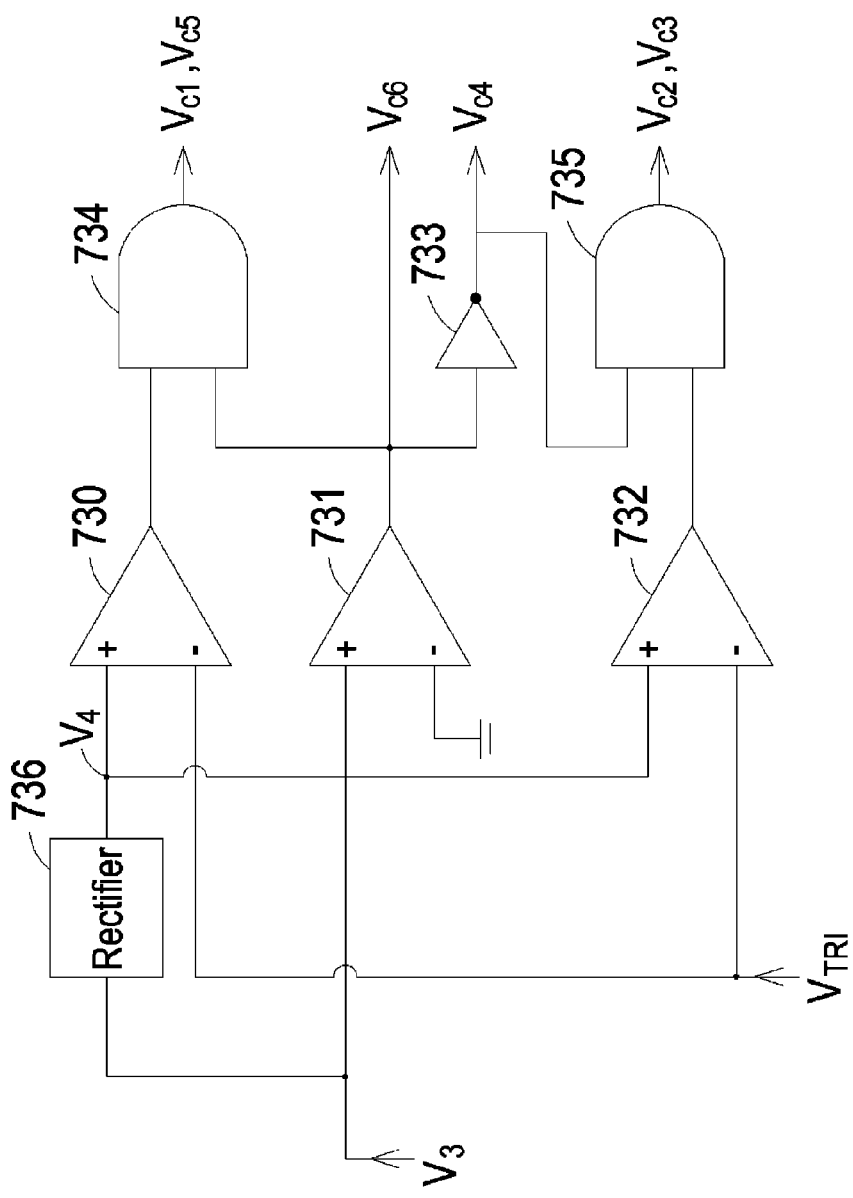
FIG. 7A shows a modified circuitry of the control unit of FIG. 4.
Figure 7B:
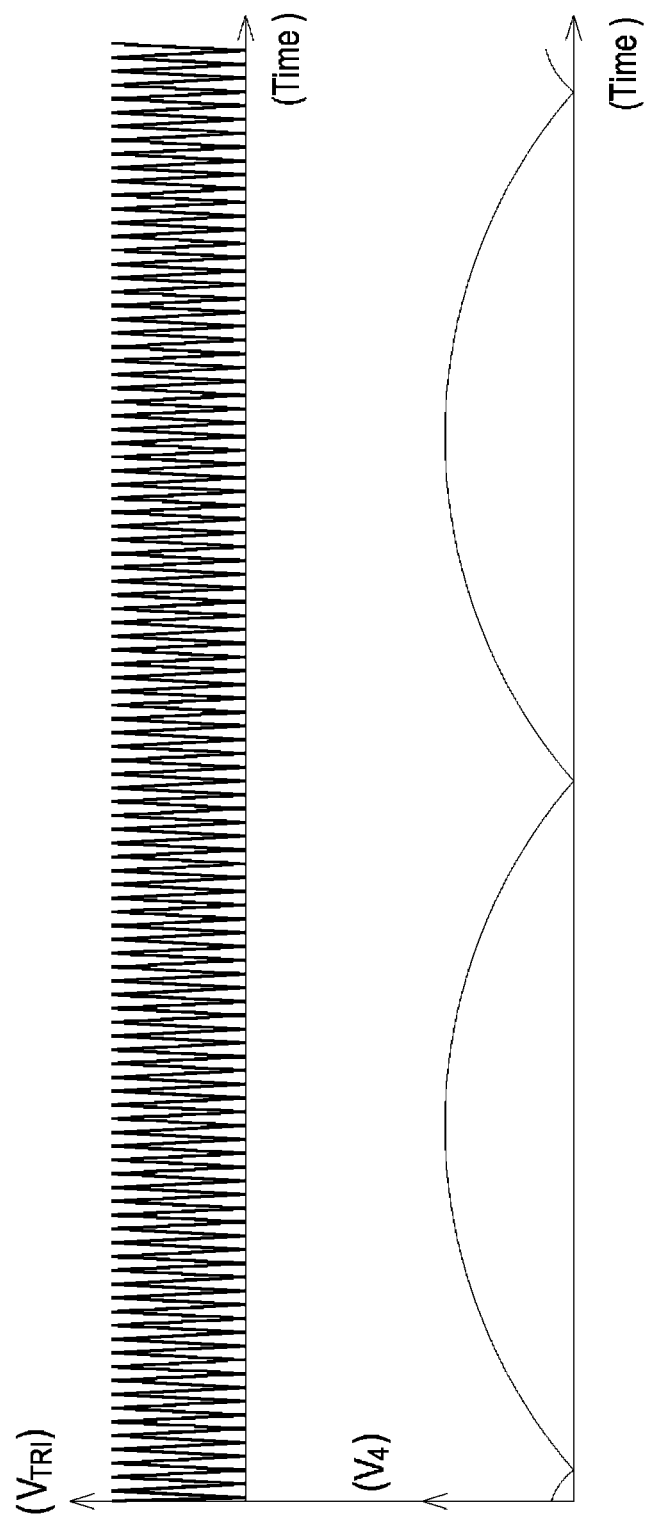
FIG. 7B shows the waveform diagrams of the control signals used within the circuitry of FIG. 7A.

Certainly, the circuitry of the control unit 43 may not be limited to the precise form disclosed herein. Referring to FIG. 7A and FIG. 7B, in which FIG. 7A shows a modified circuitry of the control unit 43 and FIG. 7B shows the waveform diagrams of the control signals used within the circuitry of FIG. 7A. In FIG. 7A, the control unit 43 includes a first comparator 730, a second comparator 731, a third comparator 732, a NOT gate 733, a first AND gate 734, a second AND gate 735, and a rectifier 736. The rectifier 736 is used to receive a sinusoidal signal $V_3$ and rectify the sinusoidal signal $V_3$ into a rectified sinusoidal signal $V_4$.

The positive input terminal of the first comparator 730 is connected to the rectifier 736 and is used to receive the rectified sinusoidal signal $V_4$. The negative terminal of the first comparator 730 is used to receive the triangular signal $V_{TRI}$. The output terminal of the first comparator 730 is connected to the first input terminal of the first AND gate 734. The positive input terminal of the second comparator 731 is used to receive the sinusoidal signal $V_3$. The negative input terminal of the second comparator 731 is grounded. The output terminal of the second comparator 731 is connected to the control terminal of the sixth switch element $S_6$, and is used to output the sixth control signal $V_{c6}$. The positive input terminal of the third comparator 732 is connected to the rectifier 736, and is used to receive the rectified sinusoidal signal $V_4$. The negative terminal of the third comparator 732 is used to receive the triangular signal $V_{TRI}$. The output terminal of the third comparator 732 is connected to a first input terminal of the second AND gate 735.

The input terminal of the NOT gate 733 is connected to the output terminal of the second comparator 731, and is used to receive the sixth control signal $V_{c6}$. The output terminal of the NOT gate 733 is connected to the fourth switch element $S_4$. The NOT gate 733 is used to invert the sixth control signal $V_{c6}$, thereby outputting the fourth control signal $V_{c4}$ at the output terminal of the NOT gate 733. The second input terminal of the first AND gate 734 is connected to the output terminal of the second comparator 731, and is used to receive the sixth control signal $V_{c6}$. The output terminal of the first AND gate 734 is connected to the control terminal of the first switch element $S_1$ and the control terminal of the fifth switch element $S_5$, and is used to output the first control signal $V_{c1}$ and the fifth control signal $V_{c5}$. The second input terminal of the second AND gate 735 is connected to the output terminal of the NOT gate 733, and is used to receive the fourth control signal $V_{c4}$. The output terminal of the second AND gate 735 is connected to the control terminal of the second switch element $S_2$ and the control terminal of the third switch element $S_3$, and is used to output the second control signal $V_{c2}$ and the third control signal $V_{c3}$.

In conclusion, the inventive DC-AC converter is configured to reduce the switching loss of the internal switch elements of the switch circuit mounted therein by placing a fourth switch element and a sixth switch element. Thus, the conversion efficiency of the DC-AC converter is improved. Also, as the DC device will not induce a significant voltage drop across the parasite capacitance resulted therefrom. Hence, the leak current can be subdued, and the risk burden on the human user and equipment can be lessened.

While the invention has been described in terms of what are presently considered to be the most practical and preferred embodiments, it is to be understood that the invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the invention which is defined by the appended claims.

What is claimed is:

1. A DC-AC converter, comprising:
   a switch circuit configured to receive a DC power and convert the DC power into an AC modulating voltage for output between a first output terminal and a second output terminal, the switch circuit comprising:
   a first switch branch including a first switch element and a second switch element connected in series with each other, wherein the first switch element and the second switch element are connected to the first output terminal; and
   a second switch branch connected in parallel with the first switch branch, and including a third switch element, a fourth switch element, and a fifth switch element connected in series with each other, wherein the fourth switch element and the fifth switch element are connected to the second output terminal; and
   a sixth switch element having one end connected between the third switch element and the fourth switch element, and the other end connected between the first switch element and the second switch element and connected to the first output terminal;
   wherein the first switch element and the fifth switch element are turned on and off simultaneously and continuously and the sixth switch element is turned on during positive half-cycles, and the second switch element and the third switch element are turned on and off simultaneously and continuously and the fourth switch element is turned on during negative half-cycles.

2. The DC-AC converter according to claim 1 wherein the second switch element, the third switch element, and the fourth switch element are turned off during positive half-cycles, and the first switch element, the fifth switch element, and the sixth switch element are turned off during negative half-cycles.

3. The DC-AC converter according to claim 2 further comprising a control unit connected to the first switch element, the second switch element, the third switch element, the fourth switch element, the fifth switch element, and the sixth switch element for controlling switching operations of the first switch element, the second switch element, the third switch element, the fourth switch element, the fifth switch element, and the sixth switch element.

4. The DC-AC converter according to claim 3 wherein the control unit comprises:
   a first comparator having a positive input terminal for receiving a first sinusoidal signal and a negative input terminal connected to a ground terminal, and an output terminal connected to a control terminal of the sixth switch element;
   a second comparator having a positive input terminal for receiving the first sinusoidal signal and a negative input terminal for receiving a triangular signal, and an output terminal connected to a control terminal of the first switch element and a control terminal of the fifth switch element;
   a third comparator having a positive input terminal for receiving a second sinusoidal signal and a negative input terminal for receiving the triangular signal, and an output terminal connected to a control terminal of the second switch element and a control terminal of the third switch element; and a NOT gate having an input terminal connected to the output terminal of the first comparator and an output terminal connected to a control terminal of the fourth switch element.

5. The DC-AC converter according to claim 4 wherein the first sinusoidal signal has a phase difference of 180 degree with the second sinusoidal signal.

6. The DC-AC converter according to claim 3 wherein the control unit comprises:

a rectifier for receiving a sinusoidal signal and rectifying the sinusoidal signal into a rectified sinusoidal signal;

a first comparator having a positive input terminal connected to the rectifier and a negative input terminal for receiving a triangular signal;

a second comparator having a positive input terminal for receiving the sinusoidal signal and a negative input terminal connected to a ground terminal, and an output terminal connected to a control terminal of the sixth switch element;

a third comparator having a positive input terminal connected to the rectifier and a negative input terminal for receiving the triangular signal;

a NOT gate having an input terminal connected to the output terminal of the second comparator and an output terminal connected to a control terminal of the fourth switch element;

a first AND gate having a first input terminal connected to an output terminal of the first comparator and a second input terminal connected to the output terminal of the second comparator, and an output terminal connected to a control terminal of the first switch element and a control terminal of the fifth switch element; and a second AND gate having a first input terminal connected to the output terminal of the NOT gate and a second input terminal connected to an output terminal of the third comparator, and an output terminal connected to a control terminal of the second switch element and a control terminal of the third switch element.

7. The DC-AC converter according to claim 1 wherein the first switch element, the second switch element, the third switch element, the fourth switch element, the fifth switch element, and the sixth switch element are configured to operate under a pulse-width modulation mode.

8. The DC-AC converter according to claim 1 wherein the first switch element, the second switch element, the third switch element, and the fifth switch element are configured to turn on and off with a high frequency, and the fourth switch element and the sixth switch element are configured to turn on and off with a low frequency.

9. The DC-AC converter according to claim 1 wherein the DC-AC converter is a non-isolated DC-AC converter.

10. The DC-AC converter according to claim 1 wherein the DC-AC converter is applicable to a solar grid-connected photovoltaic system.

11. The DC-AC converter according to claim 1 wherein the first switch element, the second switch element, the third switch element, the fourth switch element, the fifth switch element, and the sixth switch element are made up of metal-oxide-semiconductor field-effect transistors.

12. The DC-AC converter according to claim 11 wherein each of the first switch element, the second switch element, the third switch element, the fourth switch element, the fifth switch element, and the sixth switch element includes a body diode, and the direction of conduction for the body diode of the first switch element and the body diode of the second switch element is a direction pointing from the second switch element to the first switch element, and the direction of conduction for the body diode of the third switch element and the body diode of the fourth switch element and the body diode of the fifth switch element is a direction pointing from the fifth switch element to the first switch element, and the direction of conduction for the body diode of the sixth switch element is a direction pointing from the first switch branch to the second switch branch.

13. The DC-AC converter according to claim 1 wherein a first relative voltage drop between the first output terminal of the switch circuit and a common node within the DC-AC converter and a second relative voltage drop between the second output terminal of the switch circuit and the common node are set to maintain their total average value at a constant value.

14. The DC-AC converter according to claim 1 further comprising an input filter connected to the switch circuit for receiving a DC input voltage and filtering the DC input voltage, and outputting a filtered DC input voltage to the switch circuit for conversion.

15. The DC-AC converter according to claim 1 further comprising an output filter connected to the switch circuit for removing high-frequency components of the AC modulating voltage, thereby outputting an AC output voltage.

* * * * *